(12) United States Patent
Ruiz et al.

(10) Patent No.: US 7,966,172 B2
(45) Date of Patent: Jun. 21, 2011

(54) NATURAL LANGUAGE TOOL FOR SPECIFYING A SUBSET OF DYNAMIC INTER-RELATED DATA

(75) Inventors: Jon Ruiz, Eagan, MN (US); Carl Seglem, San Francisco, CA (US); Ju-Kay Kwek, San Francisco, CA (US)

(73) Assignee: Computer Associates Think, Inc., Islandia, NY (US)

( * ) Notice: Subject to any disclaimer, the term of this patent is extended or adjusted under 35 U.S.C. 154(b) by 1253 days.

(21) Appl. No.: 11/327,039

(22) Filed: Jan. 6, 2006

(65) Prior Publication Data

US 2007/0162273 A1 Jul. 12, 2007

(51) Int. Cl.
*G06F 17/27* (2006.01)
(52) U.S. Cl. .................. 704/9; 704/1; 704/10; 704/257
(58) Field of Classification Search .................. 704/9, 1, 704/10, 257
See application file for complete search history.

(56) References Cited

U.S. PATENT DOCUMENTS

| | | | |
|---|---|---|---|
| 6,282,507 B1 * | 8/2001 | Horiguchi et al. | 704/3 |
| 6,446,081 B1 * | 9/2002 | Preston | 707/104.1 |
| 2003/0104839 A1 * | 6/2003 | Kraft et al. | 455/566 |
| 2004/0088158 A1 | 5/2004 | Sheu et al. | |
| 2006/0149558 A1 | 7/2006 | Kahn et al. | |

OTHER PUBLICATIONS

Alan Cooper, Robert Reimann, "Natural Language Output: An Ideal Interface for Attribute-Based Retrieval", About Face 2.0: The Essentials of Interaction Design, 2003, pp. 205-206, Chapter 16, Wiley Publishing, Inc., Indianapolis, Indiana, USA.
Response to Office Action dated Feb. 4, 2010, U.S. Appl. No. 11/327,088, filed Jan. 6, 2006.
Office Action dated Nov. 4, 2009 in U.S. Appl. No. 11/327,088.
Office Action dated Apr. 21, 2010, U.S. Appl. No. 11/327,088, filed Jan. 6, 2006.
Response to Office Action dated Oct. 19, 2010, U.S. Appl. No. 11/327,088, filed Jan. 6, 2006.

* cited by examiner

*Primary Examiner* — Qi Han
(74) *Attorney, Agent, or Firm* — Vierra Magen Marcus & DeNiro LLP

(57) ABSTRACT

A natural language tool is provided for specifying a subset of data. The data may be dynamic and have elements which are inter-related. The natural language tool enables a user to construct a natural language expression having embedded fields to specify the subset of data. A user may configure, add and remove fields within the expression. The natural language expression contains at least two configurable fields having a tiered relationship. The fields may be associated with type-ahead functionality and menu culling, field manipulation indicators to configure the number of fields in an expression, and matching data count information for a field or the entire expression.

18 Claims, 15 Drawing Sheets

Figure 5A
Show servlets named A having parameter named country and which calls EJB named B having a parameter named city
Figure 5B
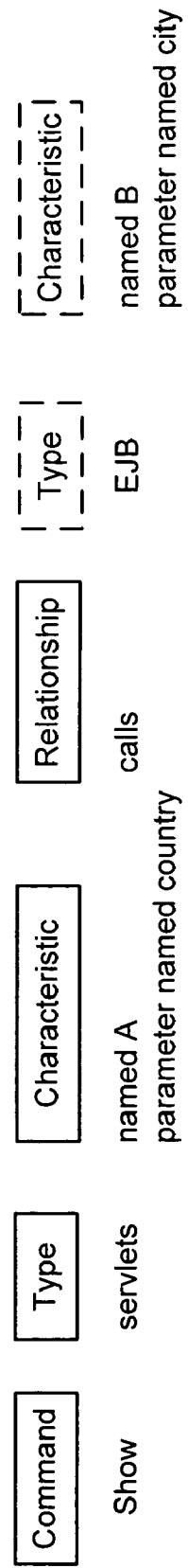
Figure 5C Show [servlet] named [A] having parameter named [country] which [calls] +
        ⌐608        ⌐609  ⌐610

Show servlets named A having parameter named country and
which [calls] [EJB] ╱922 ╱925
921⌐        (12)
       calls                    ⌐924
       is called by
       contains
       is contained by
            ⌄
                    ⌐923

Show http requests whose session parameter named country is US or whose session parameter named country is Canada and whose host name is prod 456
Figure 10B
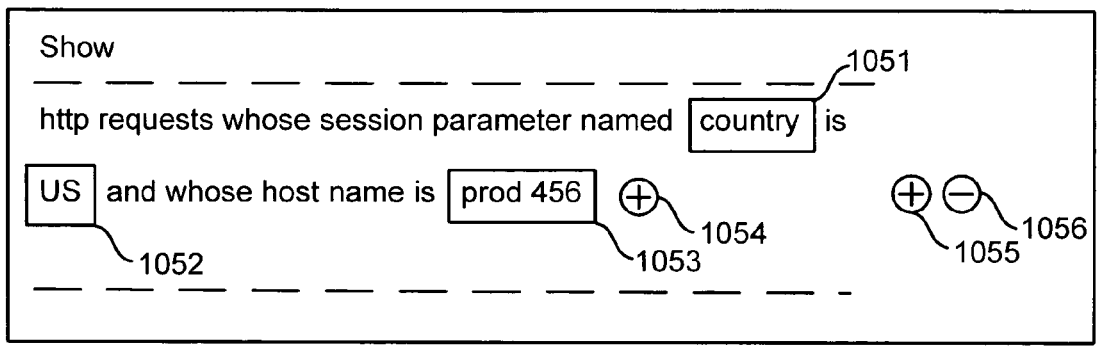
Figure 10C
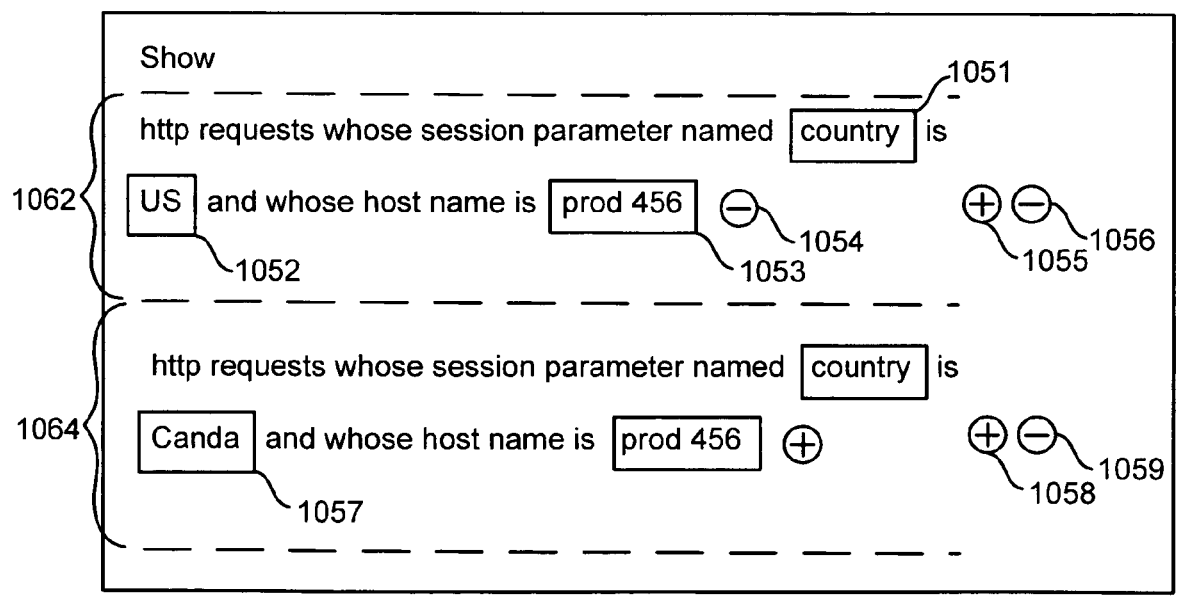
Figure 10D

| Primary Data Type | Lower tiered data Characteristic | Lower tiered data Relationship |
|---|---|---|
| EJB | name | is called by |
|  | parameter | calls |
|  | output | contains |
|  |  | is contained by |
|  |  |  |

Figure 12A

| EJB |
|---|
| name_ptr |
| parameter1_ptr |
| parameter2_ptr |
| output_ptr |
| calledby1_ptr |
| calledby2_ptr |
| calls_ptr |
| contains_ptr |
| containedby_ptr |

Figure 12B

NATURAL LANGUAGE TOOL FOR SPECIFYING A SUBSET OF DYNAMIC INTER-RELATED DATA

BACKGROUND

Web services have become more popular as more people access the Internet. The ability of a company to monitor the performance of its web service is important to provide an uninterrupted web-based service and a satisfactory experience for web service customers. One way a web service can be monitored is by viewing performance data of the components comprising the service. In particular, a web service administrator may analyze a set of application data associated with web service components. After analyzing the application data, the administrator may determine how the service is performing, trouble shoot web service issues, and perform other tasks.

Some systems allow administrators or users to analyze data by viewing a subset of the data. In order to view a desired subset of a group of data, some systems allow a user to specify filter terms to a filtering mechanism. The filtering mechanism filters the group of data using the terms and provides the resulting data to the user.

Some filtering mechanisms utilize natural language processing to specify terms. These mechanisms are useful because natural language grammar can be used to express the desired result. A user may type a sentence into an interface. The filter then parses the sentence to identify components of the sentence and retrieves the data specified by identified components. However, processing of the natural language is complicated. Typical computers do not have the resources to process natural language queries that are subject to dialect, misunderstanding and other factors that may change from person to person.

Another previous filtering mechanism is natural language output. In natural language output, a user may choose a selection from a fixed array of terms for a number of pre-selected fields. Each array is associated with a bounded list of choices. A user may select a choice from an array using a drop down menu. The natural language output mechanism then retrieves a set of data corresponding to the user choices.

Previous natural language filtering mechanisms are limited. For instance, previous mechanisms do not have a feature for adding or removing optional clauses. Rather, a user is restricted to working with the fields provided. Additionally, field selections are bounded to data known by the application.

SUMMARY

The present technology, roughly described, pertains to specifying a subset of inter-related data. In one embodiment, the subset of data may be part of a large, complex and dynamic group of data. The complexity of the data may result in part from the inter-relationships between a large number of entities comprising the data. The dynamic nature of the data may be due to ongoing changes and updates, which can be made to the data as subsets are specified. In one embodiment, the data may be associated with application management.

In one embodiment, a natural language tool may be used to specify the subset of inter-related data. The natural language tool may enable a user to construct a natural language expression. The natural language expression may include one or more embedded fields. The fields of an expression have a tiered relationship. The natural language expression is constructed as a user configures the fields using the natural language tool. A user may configure, add and remove fields within the expression.

In some embodiments, each field is associated with a category. Different fields in an expression may share or have unique categories. The categories may vary depending on the group of data being processed. One category may express a relationship between two other fields. The two related fields may be the same type of field or different fields.

The natural language tool may retrieve data locally or from a remote source. In some cases, the data may be maintained in a data store. The data store maintains a group of data which is dynamic along with the source of the data. In the case of an application system, the data store may receive data from one or more application servers and the natural language tool. The data store may provide data to the natural language tool in response to a data request.

The natural language tool may include several features. Some fields may allow text entry into a text box. These fields may be associated with type-ahead functionality and menu culling in a drop down menu associated with the field. Fields may be added and removed within the natural language expression using field manipulation indicators. When entering data in a particular field, the expression may indicate the number of matches for a particular field or the entire expression.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 5A is a block diagram illustrating an example of tiered relationships between fields in a natural language expression.

FIG. 5B is an embodiment of an example of a natural language expression.

FIG. 5C is a block diagram illustrating the fields of an exemplary natural language expression.

FIG. 9B is a block diagram of an embodiment of an interface for receiving a selection in a drop down menu in a natural language tool.

FIG. 10B is an example of a natural language expression.

FIG. 10C is an example of a natural language expression having a condition block.

FIG. 10D is an example of a natural language expression having a condition blocks.

FIG. 12A is a table of an exemplary data format for use with a natural language tool.

FIG. 12B is an exemplary data structure for use with a data that supports a natural language tool.

DETAILED DESCRIPTION

Figure 1:
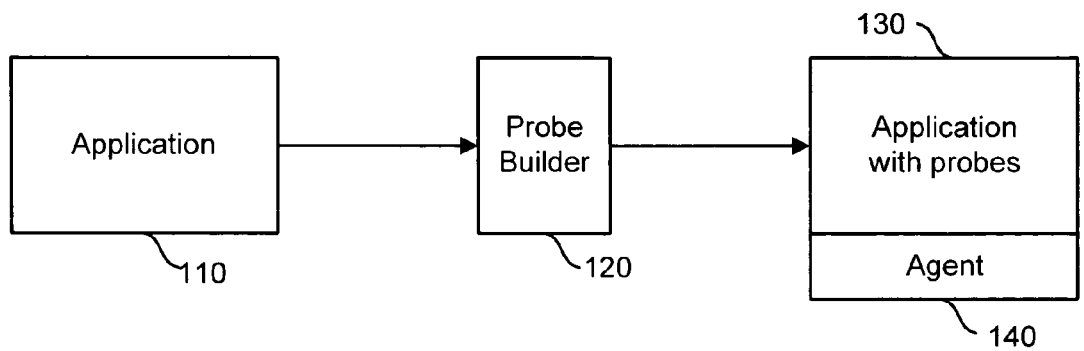
FIG. 1 is embodiment of a block diagram illustrating how bytecode for an application is implemented.

A subset of inter-related data is specified using a natural language tool. The natural language tool constructs a natural language expression to specify the data subset. The expression includes fields of data which are configured by a user. The fields may each include a clause consisting of two or more words or nested fields. The fields specify types of data as well as relationships between data elements. The specified data may be a subset of a large, complex and dynamic group of data. The data may be associated with an application system or some other data type. In some cases, once the data is specified, the natural language tool may be used for specifying data to show, specifying data and conditions to monitor (e.g., alerts), specifying user-defined constructs (e.g., application definition), and other uses. After specifying the subset of data, the natural language tool may optionally execute a command on the data. The command may involve plotting the data, showing the data over a period of time, generating an alert in response to detecting a condition has been met, or some other command. Thus, in one embodiment, an action is performed on the data based on the settings of the natural language tool.

The natural language tool enables a user to construct a natural language expression in a user interface. The natural language expression may include one or more embedded fields. Each embedded field may include a clause which includes one or more fields. The natural language expression is constructed as a user configures the embedded fields using the natural language tool. A user may add and remove fields as well as configure data elements and/or clauses for fields within the expression.

In one embodiment, a natural language expression contains at least two fields. The fields of an expression can have a tiered relationship. In this case, one or more lower tiered fields change automatically in response to a change in a higher tiered field. In one embodiment, each field may be associated with a category. For example, for a set of application management data, the fields may have categories of "command," "type," "characteristic," "relationship" and "metric." In this case, a natural language expression specifying a subset of application management data will include a command and type field, and may optionally include additional fields. This is discussed in more detail below with respect to FIG. 5A.

A relationship field indicates a relationship between data elements of two other fields. The two related fields may be the same type of field or different fields. In one embodiment, the relationship specified is between two clauses. For example, "servlets named A" may be a first clause and "EJBs named B" may be a second clause, wherein each consists of multiple fields. For instance, the relationship specified in the relationship field may be associated with elements in two "type" fields. In this case, the relationship field may specify communication between the element types, use of one element by another, containment of one element, or some other relationship between the elements. Additionally, a natural language expression may have nested relationships. Relationship fields are discussed in more detail below.

The natural language tool may access data from one or more data stores. A data store may be implemented on the same machine as the natural language tool, on a remote machine, or both. In one embodiment, data can be accessed from the data store in response to user configuration of a field. In this case, the natural language tool may provide up to date data from a dynamic data store for a field. A data store may receive data from the system associated with the data, application servers, server front ends, server backends or from some other source. In some cases, the data store may receive data queries from the natural language tool. In one embodiment, when the data is associated with an application management system, the data may be sent to the data store by one or more application servers. Data stores for use with a natural language tool are discussed in more detail below with respect to FIG. 11.

In one embodiment, the technology herein can be used to monitor behavior of an application on an application server using bytecode instrumentation. The technology herein may also be used to access information from the particular application. To monitor the application, an application management tool may instrument the application's object code (also called bytecode). FIG. 1 depicts an exemplar process for modifying an application's bytecode. FIG. 1 shows Application 110, Probe Builder 120, Application 130 with probes and Agent 140. Application 130 includes probes used to access information from the application, and application 110 is the application before the probes are added. Application 110 can be a Java application or a different type of application.

Probe Builder 120 instruments (e.g. modifies) the bytecode for Application 110 to add probes and additional code to Application 110 in order to create Application 130. The probes may measure specific pieces of information about the application without changing the application's business logic. Probe Builder 120 also generates Agent 140. Agent 140 may be installed on the same machine as Application 130 or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

In one embodiment, the technology described herein doesn't actually modify source code. Rather, the present invention modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Figure 2:
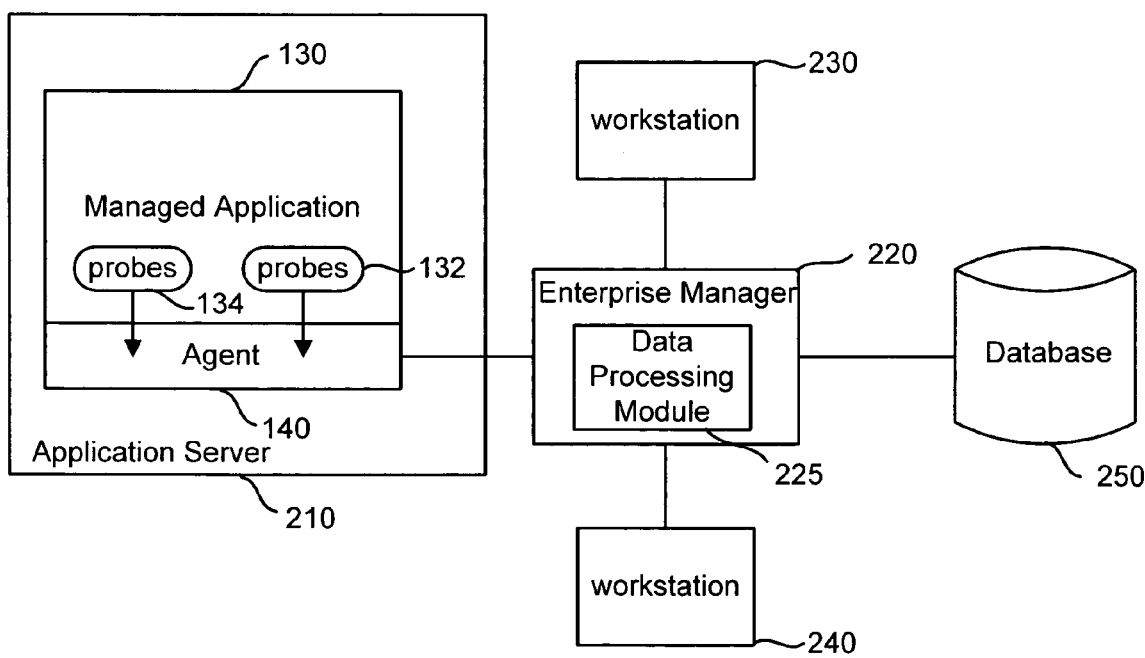
FIG. 2 is a block diagram of an embodiment of a system for monitoring an application.

FIG. 2 is a conceptual view of the components of the application performance management tool. In addition to managed Application 140 with probes 132 and 134, FIG. 2 also depicts Enterprise Manager 220, database 250, workstation 230 and workstation 240. As a managed application runs, probes (e.g. 132 and/or 134) relay data to Agent 140. In one embodiment, probes 132 and 134 may be implemented in objects and other code that write data, change data or otherwise cause the state of an application server to change. Agent 140 then collects, summarizes and sends the data to Enterprise Manager 120.

Enterprise Manager 120 receives performance data from managed applications via Agent 140, runs requested calculations, makes performance data available to workstations 230-240 and optionally sends performance data to database 250 for later analysis. The workstations (e.g. 124 and 126) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections. In some embodiments, other the natural language tool can be implemented in the console window, explorer window and other windows within an interface.

In one embodiment of the system of FIG. 2, each of the components is running on different machines. That is, workstation 230 is on a first computing device, workstation 240 is on a second computing device, Enterprise Manager 220 is on a third computing device, and Managed Application 130 is running on a fourth computing device. In another embodiment, two or more (or all) of the components are operating on the same computing device. For example, Managed Application 130 and Agent 140 may be on a first computing device, Enterprise Manager 220 on a second computing device and a workstation on a third computing device. Alternatively, all of the components of FIG. 2 can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the invention is implemented in software that is stored on one or more processor readable storage devices and is used to program one or more processors.

In one embodiment, the natural language tool discussed herein can be used to specify subsets of application management data. In this case, the application data is retrieved from one or more application servers, server frontends, server backends, or other modules of a system. In particular, the application data is received from one or more agents in communication with managed applications on one or more application servers, as discussed above. Aspects of the data may also be retrieved from the natural language tool itself. This is discussed in more detail below.

In another embodiment, the natural language tool of the present invention may be used to process and specify a subset of data associated with other types of data. For example, the natural language tool could be used to specify subsets of data in groups of genome data, epidemiological data, and other data groups that involve a large, complex inter-related set of data. For purposes of discussion, the natural language tool is discussed herein with respect to application management data. However, this is not intended to limit the scope of the natural language tool.

Figure 3:
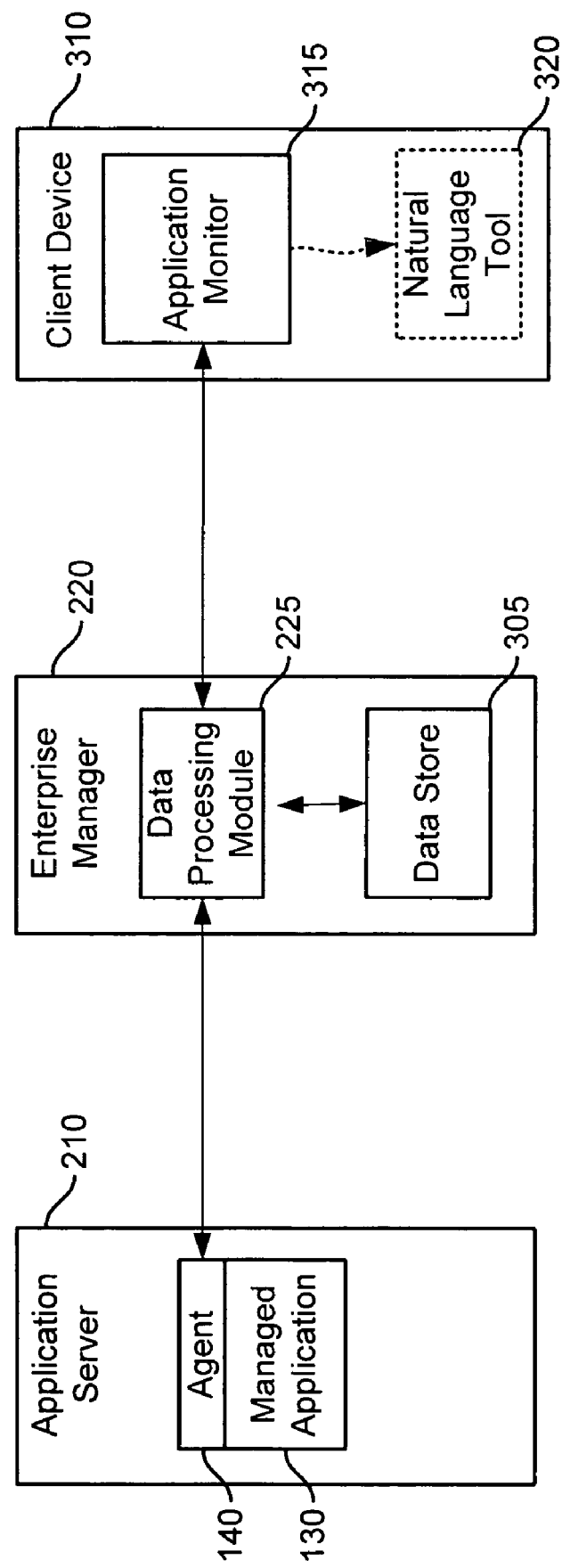
FIG. 3 is a block diagram of an embodiment of a system for implementing a natural language tool.

FIG. 3 is a block diagram of an embodiment of a system for implementing a natural language tool. FIG. 3 includes application server 210, enterprise manager 220 and client device 310. Enterprise manager 220 may send and receive messages with application server 210 and client device 310. In one embodiment, enterprise manager may communicate with application server 210 and client device 310 over a network, such as the Internet.

Application server 210 may be a server in communication with a web server which provides a front end of a web service over the Internet. Application server 210 includes managed application 130 and agent 140. As discussed above, agent 140 receives data from probes inserted into managed application 130. The data received by agent 140 may be associated with objects, servlets and other data from the components and other entities of managed application 130.

In one embodiment, agent 140 may receive a range of data regarding application management entities from probes in managed application 130. Agent 140 may also receive entity parameters associated with the entity or component. The parameters may include an object that called the component, the name of the called component and other parameters of the component.

Agent 140 sends the received data to enterprise manager 130. In one embodiment, the data is sent to data processing module 225 of enterprise manager 220. This is discussed in more detail below. The data sent can include data for the particular component as well as relationship data for that component. For example, if an EJB is called, the probes of managed application 130 may send EJB identification information, parameters associated with the EJB, an object or other component that called the EJB and other information.

Enterprise manager 220 includes data processing module 225 and data store 305. Data processing module 225 receives application data from agent 140 and data requests from application monitor 315. Data store 305 receives new data, requests for stored data, and other data processing instructions from data processing module 225.

In one embodiment, data store 305 contains data associated with an application management system. The application management system may be associated with managed application 130 as well as other managed applications. The additional managed applications may include an agent or other mechanism that sends application data to data processing module 225. Though no other application servers or managed applications are illustrated in FIG. 3, data processing module 225 may receive application data from other application servers, server backends, server frontends, and other modules. Operation of data store 305 and data processing module 225 is discussed in more detail below.

Client device 310 includes application monitor 315. Application monitor 315 provides natural language tool 320 as indicated by the dotted lines in FIG. 3. In one embodiment, the natural language tool associated with the present technology is provided within a user interface provided by client device 310. Application monitor 315 enables a user to monitor performance of one or more applications and perform actions on one or more subsets of the data maintained in data store 305. This is discussed in more detail below.

Figure 4:
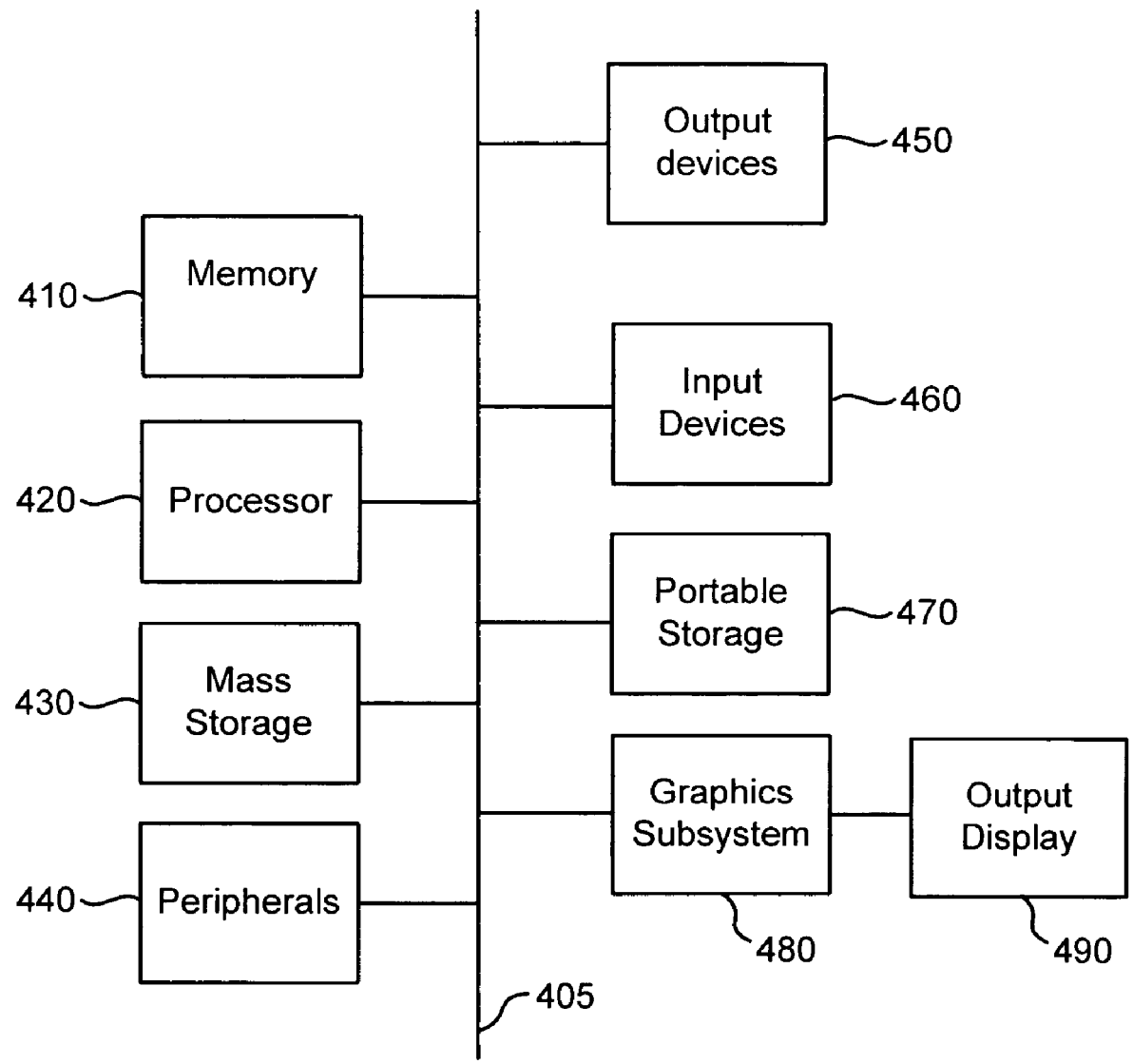
FIG. 4 is a block diagram of an embodiment of a computing system for implementing the present technology.

FIG. 4 illustrates an embodiment of a computing system for use with the present technology. In one embodiment, the computing system illustrated in FIG. 4 may be used to implement application server 210, enterprise manager 220, client device 310, work stations 230-240 and database 250.

The computer system of FIG. 4 includes one or more processors 420 and main memory 410. Main memory 410 stores, in part, instructions and data for execution by processor unit 420. If the system of the present invention is wholly or partially implemented in software, main memory 410 can store the executable code when in operation. The system of FIG. 4 further includes a mass storage device 430, peripheral device(s) 440, user input device(s) 460, output devices 450, portable storage medium drive(s) 470, a graphics subsystem 480 and an output display 490. For purposes of simplicity, the components shown in FIG. 4 are depicted as being connected via a single bus 405. However, the components may be connected through one or more data transport means. For example, processor unit 420 and main memory 410 may be connected via a local microprocessor bus, and the mass storage device 430, peripheral device(s) 440, portable storage medium drive(s) 470, and graphics subsystem 64 may be connected via one or more input/output (I/O) buses. Mass storage device 430, which may be implemented with a magnetic disk drive or an optical disk drive, is a non-volatile storage device for storing data and instructions for use by processor unit 420. In one embodiment, mass storage device 430 stores the system software for implementing the present invention for purposes of loading to main memory 410.

Portable storage medium drive 470 operates in conjunction with a portable non-volatile storage medium, such as a floppy disk, to input and output data and code to and from the computer system of FIG. 4. In one embodiment, the system software for implementing the present invention is stored on such a portable medium, and is input to the computer system via the portable storage medium drive 470. Peripheral device (s) 440 may include any type of computer support device, such as an input/output (I/O) interface, to add additional functionality to the computer system. For example, peripheral device(s) 440 may include a network interface for connecting the computer system to a network, a modem, a router, etc.

User input device(s) 460 provides a portion of a user interface. User input device(s) 460 may include an alpha-numeric keypad for inputting alpha-numeric and other information, or a pointing device, such as a mouse, a trackball, stylus, or cursor direction keys. In order to display textual and graphical information, the computer system of FIG. 4 includes graphics subsystem 480 and output display 490. Output display 490 may include a cathode ray tube (CRT) display, liquid crystal display (LCD) or other suitable display device. Graphics subsystem 480 receives textual and graphical information, and processes the information for output to display 490. Additionally, the system of FIG. 4 includes output devices 450. Examples of suitable output devices include speakers, printers, network interfaces, monitors, etc.

The components contained in the computer system of FIG. 4 are those typically found in computer systems suitable for use with the present invention, and are intended to represent a broad category of such computer components that are well known in the art. Thus, the computer system of FIG. 4 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The natural language tool allows a user to construct a filter which specifies a subset of data. The filter may be expressed as a natural language expression which includes a number of tiered embedded fields or categories of fields. FIG. 5A is a block diagram illustrating a set of exemplary fields having a tiered relationship which may be used in a natural language expression. Each field may contain a clause. For example, there may be type field clauses, relationship clauses, characteristic field clauses and metric field clauses. The exemplary fields illustrated in FIG. 5 are "command", "type", "characteristic", "relationship" and "metric". Each field has a tiered relationship with another field. The tiered relationship may be with a neighboring field or other field. For the fields shown, the "command" field is the highest tiered data field and the "metric" field is the lowest tiered data field. In one embodiment, the "characteristic" and "relationship" field may be on the same tier. In this embodiment, the two fields have an exchangeable order in FIG. 5A and a change in one does not affect the other.

Each field shown in FIG. 5A is associated with a particular type of data or aspect of data. Data for the command field indicates what should be done with data specified by the remainder of the natural language expression. Examples of commands include show all, show over time, show over time compared to a previous time (for example, compared to two weeks ago), plot, define an application, and provide an alert. A "show all" may show data elements within the specified subset (specified by the natural language expression) should be displayed. A "plot" indicates that data specified in the subset should be plotted. An "alert" specifies conditions when alerts should be generated. An application definition specifies a set of components and URL characteristics that define an application. Application definitions enable a user to define are user-defined constructs.

A "type" field specifies a thing or element which is to be filtered. "Type" data may include a single field or a clause consisting of two or more fields specifying anything for which measurable data may be retrieved. Examples of a "type" data include an EJB, applications, servlets, requests, subsystems and other application management components and entities. A "characteristic" field may include a single field or a clause consisting of two or more fields with data acting as a modifier for the "type" data field. A characteristic may be implemented as a clause or a single field. Examples of "characteristic" data may include a name, parameter, location or other characteristic. Characteristic fields or clauses may change depending on the "type" field specified.

A "relationship" field indicates a relationship between two or more "type" data fields or clauses. A "relationship" field may consist of a type, optional "characteristic clauses" and optional "relationship clauses". The "relationship" field is optional in a natural language filter. "Relationship" data typically includes a relationship and an object of the relationship. For example, relationships between data types may include a call, use, containment, deployment, cluster, constituent and category relationships. Additionally, the opposite may serve as a relationship as well, for example "called by", "contained by" and so on.

The "metric" field is the lowest tiered data field. The "metric" field may include data specifying type of metric to display. Examples of "metrics" data include availability, response time, invocation count and number of errors.

The general progression of fields in a natural language expression follows the order indicated in FIG. 5B, wherein the first field is the highest tiered field. In some embodiments, the progression of fields differs from that illustrated in FIG. 5B. For example, a natural language expression provided by natural language tool 320 does not require a metrics field. In some cases, the relationship field and characteristic field may be reversed in order within the expression.

An actual natural language expression may also differ from that illustrated in FIG. 5B in that a type of field may occur more than once. For example, a relationship field may include a clause which includes the relationship data, the data type which has the relationship, and a characteristic of the related data. Thus, the field progression may go as follows: command, type characteristic relationship, type characteristic. Additional relationships and characteristics may be added to any specified type data within a clause. Thus, a natural language expression may be extended with several nested occurrences within a clause for one or more field categories.

FIG. 5B illustrates an example of a sentence that can be implemented as a natural language expression. The sentence of FIG. 5B reads "Show servlets named A having parameter named country and which calls EJB named B having a parameter named city". FIG. 5C illustrates the fields associated with the natural language expression of 5B. FIG. 5C includes fields of "command", "type", "characteristic" and "relationship." Each field is associated with a list of terms found in the expression of FIG. 5B. In particular, type and characteristic are listed twice to indicate the fields associated with the relationship between the servlet and EJB. The command field for FIG. 5B is "show", and is illustrated under the "command" field category in FIG. 5C. The first "type" field for the expression of FIG. 5B is "servlets." The "characteristics" associated with "servlet" are "named A" and "parameter named country." The relationship data for the servlet type is "calls." A second type and character are specified as well. The second occurrence of the type and character fields are illustrated in dashed lines to indicate that they are associated with the relationship specified with respect to the "servlet" type data. In particular, the second type data is "EJB" and the second characteristic data is "named B" and "parameter named city." No metric field is displayed in the current expression.

FIGS. 6A-6D illustrate construction of an exemplary natural language expression in a user interface using a natural language tool. Each of FIGS. 6A-6D illustrates a different state of an expression. The expression is constructed by providing input into fields embedded in the expression. In addition, various indicators may be selected to configure fields and other aspects of the natural language expression.

In some embodiments, as the user chooses values for fields, the natural language tool chooses defaults and may pre-populate fields which may require a query to the data model. A query to the data model may happen because the natural language tool puts in default values or the user chooses something. In some cases, the natural language tool attempts to anticipate what the user will choose next and behaves as if the user actually did it. For example, the natural language tool may retrieve a list of data elements for a field based on selection or input associated with a different field. In some embodiments, the query for dynamic data doesn't happen until the user expands a menu that must be populated by dynamic data. In some embodiments, supporting grammar may be used within a natural language expression. The supporting grammar may be used along with configured fields to make the natural language expression flow like a grammatically correct sentence.

In one embodiment, a user may specify a data element in a field when the data element is not known to the system. In this case, the unknown data element is included in a query sent to the data store along with other data in response to the user input. In this case, any query before the element exists returns empty. Once the element does exist, the query will return expected data. The other data, including relationship data, can be used to define parameters and characteristics of the unknown data. For example, the data may include a specification of a "servlet" type data called "new" which is as of yet unknown to the data store. The data may also include data characteristics indicating that the servlet called "new" includes two known EJBs. Thus, when the known EJBs are called, the data store may record data that the new servlet was called. The unknown data element can then be defined in terms of the other data and stored within the data store.

Figure 6A:
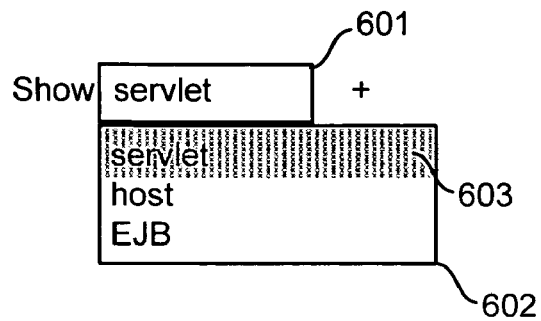
FIG. 6A is an example of a natural language expression provided by a natural language tool.

FIG. 6A includes a natural language expression which reads "Show servlets" and includes field 601, drop down menu 602 and highlight 603. The "show" data comprises the command field of the expression. In one embodiment, the user may select the command to start the expression with, or a default command may be chosen. The "servlets" data in the expression is a "type" data. In one embodiment, a list of type data may be provided in dropdown menu 602 in response to selection of the command data. A highlight 603 may be provided over a default data which is the most popular data associated with the particular higher tiered field. For example, the servlet data is highlighted in drop down menu 602 because it may be the most popular type data for a command of "show." The list of type data may be retrieved from a local source on client device 310 or from a remote source, such as data store 305. Processing input to retrieve data is discussed in more detail below with respect to FIG. 8. Also displayed at the end of the expression is a "+" indicator. The "+" indicator allows a user to add additional fields to the expression. In particular, a list of characteristics and/or relationships may be provided in a drop down menu in response to user selection of the "+" indicator. In one embodiment, all natural language expressions may include "+" indicator at the end of the expression to allow a user to expand the expression with further fields. In one embodiment, the "+" and "−" indicators can appear anywhere in the expression. They may also remain present in the expression even after the sentence is constructed so that the user can continue to change the sentence (e.g. if they got something wrong or want to look at it in a slightly different way).

Figure 6B:
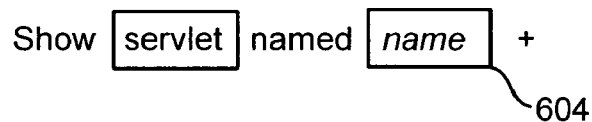
FIG. 6B is an example of a natural language expression provided by a natural language tool.

FIG. 6B includes a natural language expression which reads "Show servlets named name" and includes field 604. In one embodiment, the expression of FIG. 6B is the expression of FIG. 6A after a user has completed selecting "servlets" as the type data in field 601. In response to the selection, natural language tool 320 provides a characteristic field. The characteristic field provides a characteristic for the type "servlets." In particular, a default characteristic of name is selected by the natural language tool 320. The default data may be retrieved locally or remotely. Additionally, a field box is provided to enter a name for the servlets. Processing of user entered text in a text box is discussed in more detail below with respect to FIG. 8. In one embodiment, a user may change the default characteristic from name to some other characteristic. In this case, a visual indicator associated with the characteristic may be selected to change the characteristic data. The visual indicator is not illustrated in FIG. 6B for purposes of illustration simplification.

Figure 6C:
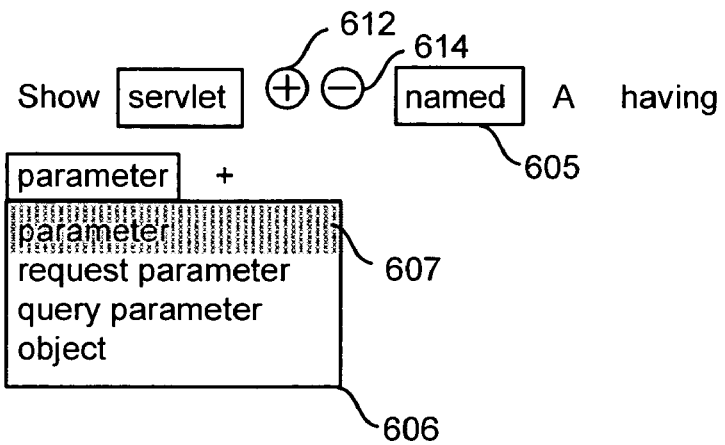
FIG. 6C is an example of a natural language expression provided by a natural language tool.

FIG. 6C includes a natural language expression which reads "Show servlets named A and having parameter" and includes field 605, drop down menu 606 and highlight 607. In one embodiment, the expression of FIG. 6C is the expression of FIG. 6B after a user has completed entering a servlet name of "A" in field text box 604 selected the "+" indicator at the end of the expression. As a result of these actions, the expression of FIG. 6C is provided. In particular, drop down menu 606 is provided in response to selection of the "+" indicator. In drop down menu 606, the "parameter" data is currently highlighted as a default selection.

Figure 6D:
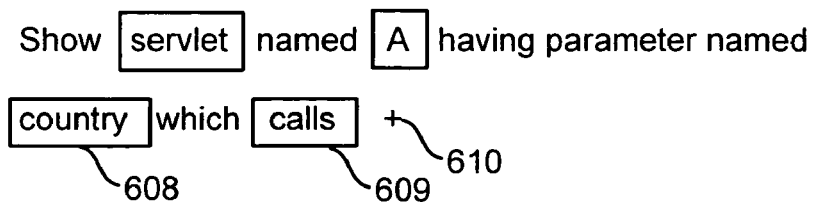
FIG. 6D is an example of a natural language expression provided by a natural language tool.

FIG. 6D includes a natural language expression which reads "Show servlets named A and having parameter named country which calls" and includes fields 608-609 and indicator 610. In one embodiment, the expression of FIG. 6D is the expression of FIG. 6C after a user has completed entering a servlet name of "A" in text box 605, typed the text "country" as a characteristic for the type "servlets", selected the "+" indicator at the end of the expression and selected a relationship data of "calls." The expression now contains an additional characteristic data "country" and an additional field category of "calls." The "+" indicator 610 can be selected again to choose additional characteristics, relationships or metric data.

In the example natural language expression discussed above with respect to FIGS. 6A-6D, the field "servlets" is plural. In some embodiments, fields and clauses of different categories may be listed as plural, singular or both, depending on the field or clause as well as the data to be searched.

Figure 6E:
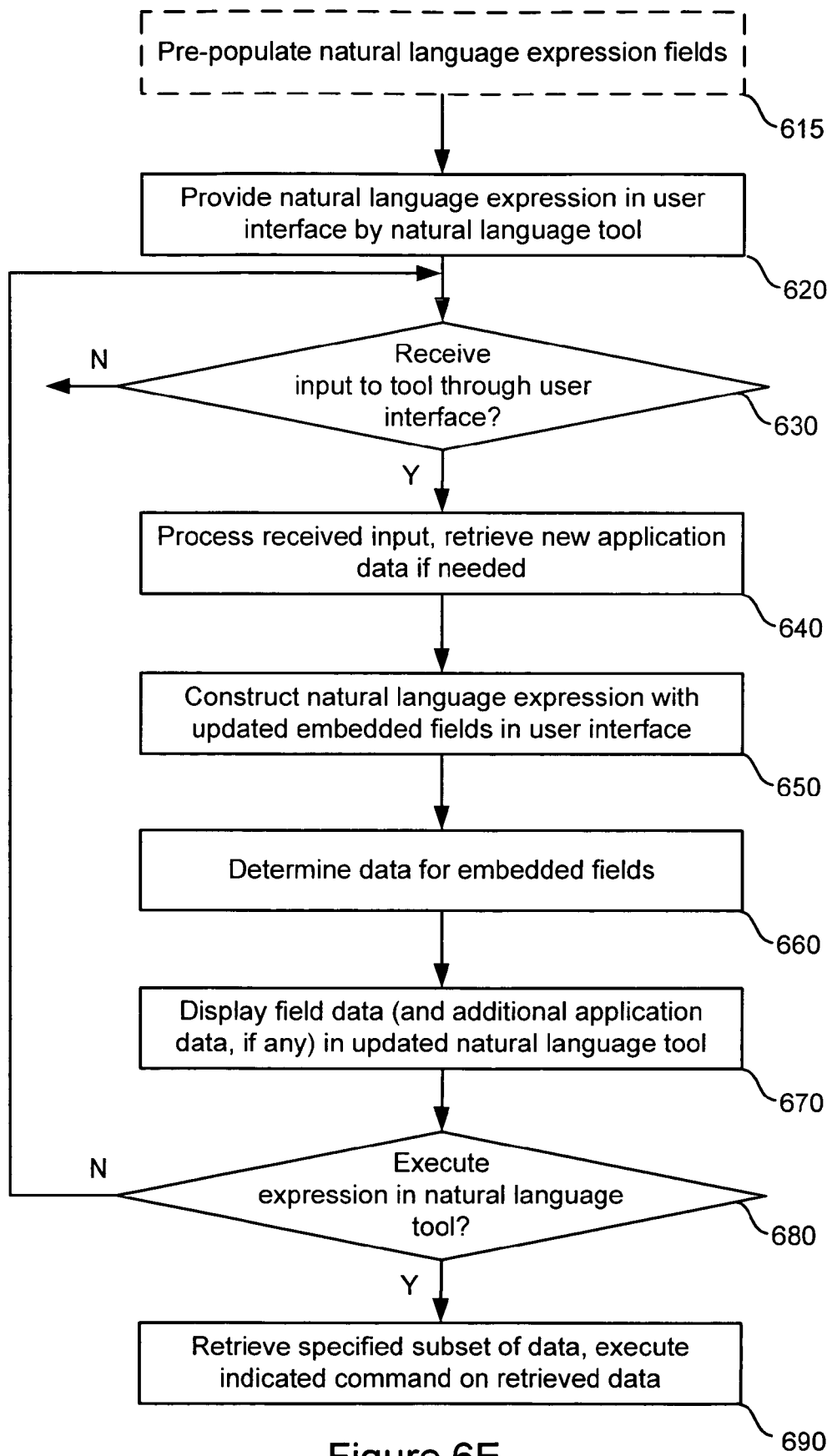
FIG. 6E is a flow chart of an embodiment of a process for generating a filter using a natural language tool.

FIG. 6E is a flow chart of an embodiment of a process for generating a filter using a natural language tool. First, the natural language expression fields are pre-populated at step 610. This step is optional as indicated by the dashed line comprising step 610. In some embodiments, the fields of the natural language expression may be pre-populated in response to a system condition. The system condition causing pre-population may include an application error, the occurrence of an alert or some other condition. In the case of alerts, the natural language tool is invoked by the user to configure the conditions under which alerts should happen and what the system should do (e.g. send an email). Pre-population of natural language expression fields by a natural language tool is discussed in more detail below with respect to FIG. 7.

Next, a natural language expression is provided by natural language tool 320 in a user interface at step 620. If the natural language expression was pre-populate at step 615, the pre-populated fields are included in the expression. If the expression is not pre-populated at step 615, the expression may be provided with an initial field box associated with a command field. The initial field box may be configured to provide a drop down menu containing default data elements to allow a user to select the command to begin the expression with. In one embodiment, the default expression typically includes a drop down menu of common commands associated with an application management system. Next, a determination is made as to whether input is received through the user interface at step 630. The input may include a selection from a drop down menu, entering text into a text box, drag and drop of text into a field or some other type of input. If no input is received at step 630, the flow chart of FIG. 6E remains at step 630 until input is received. If input is received to edit the natural language expression, the flowchart of FIG. 6E continues to step 640.

If input is received to execute the natural language expression, the flowchart of FIG. 6E continues to step 690. At step 690, the specified subset of data is retrieved and the indicated command is executed on the retrieved data. In some embodiments, at step 690, an action is performed on the data based on the settings of the natural language tool. In any case, the natural language tool may act on the retrieved data by plotting the data, showing the data over a period of time, generating an alert in response to detecting a condition has been met, or perform some other action.

The received input to edit the natural language expression is processed and new application data is retrieved at step 640. In one embodiment, processing received input includes retrieving application data from data store 305 in response to the received input. The data store may be locally stored on client device 310 remotely stored on enterprise manager 220, or both. When located remotely, a request is sent to the data store for new application data. Processing received input by a natural language tool is discussed in more detail below with respect to FIG. 8. Next, a natural language expression is constructed with updated embedded fields at step 650. For example, if command data is received as input at step 630, the natural language expression will be expanded to allow a user to input "type" data into a type field of the expression.

Next, default data for the embedded fields is determined at step 660. In one embodiment, the default data for the embedded fields is retrieved locally or from remote data store 305 in response data retrieved at step 640. For instance, default data in the retrieved data may be flagged, the first entry in a data array, or otherwise marked as a default data. Next, the default application data is displayed in the natural language expression fields provided by the natural language tool at step 670. In one embodiment, other application data may also be displayed. After displaying field data at step 670, the flow chart of FIG. 6E returns to step 630 where a determination is made as to whether additional user input is received.

Figure 7:
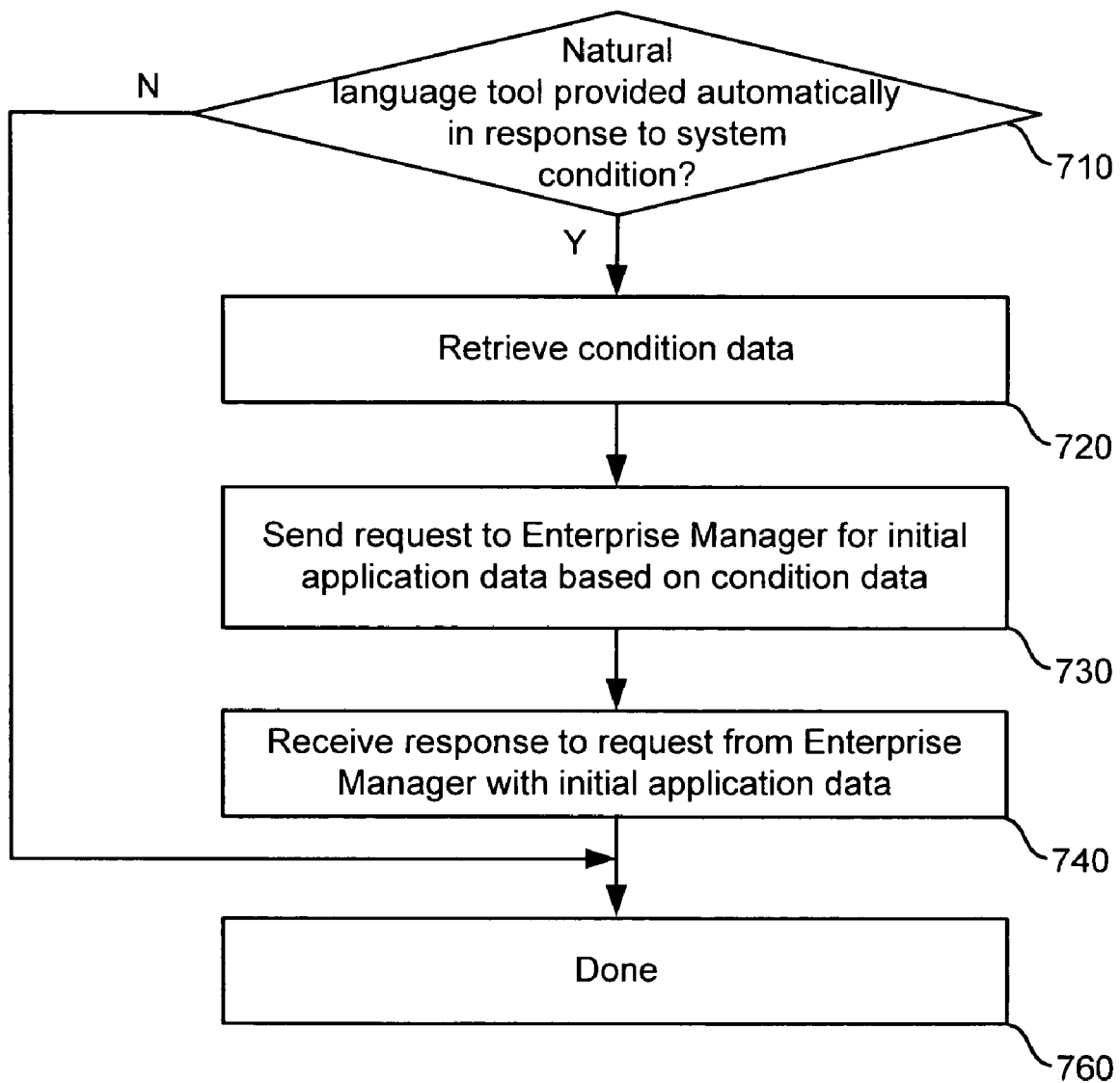
FIG. 7 is a flow chart of an embodiment of a process for pre-populating a natural language expression provided by a natural language tool.

FIG. 7 is a flow chart of an embodiment of a process for pre-populating a natural language tool. In one embodiment, the flow chart or FIG. 7 provides more detail for step 610 of FIG. 6E. First, a determination is made as to whether the natural language tool is provided automatically in response to a system condition at step 710. If the filter is not provided automatically in response to a system condition, the flow chart of FIG. 7 continues to step 760 where the flow chart ends. A filter may be provided automatically if there is an error detected during application performance, an alert is triggered, or some other condition is met. If the filter is provided automatically in response to a system condition, the condition data is retrieved at step 720. In one embodiment, retrieving condition data may include retrieving an application name, a servlet called, or other information about some component that caused or is otherwise associated with the system condition which occurred. Next, a request is sent to enterprise manager 220 for initial application data at step 730. The request for initial application data is based on the condition data retrieved at step 720. For example, the initial application data request may include the name of an application or servlet which caused an error during application performance. Processing of a request to enterprise manager 210 is discussed in more detail below with respect to FIG. 11.

A response is received from enterprise manager 220 which includes the initial application data at step 740. The initial application data is received in response to the request sent at step 730. The response may include data for the requested type and relational data for that type. For example, if the application data request included the name of an application, the response can include characteristics, relationships and other information associated with that component to provide default information in the natural language tool. After the natural language filter is populated, the flow chart of FIG. 7 is done at step 760. Data retrieved from the application data response can be used to populate the natural language expression at step 650 of FIG. 6E.

Figure 8:
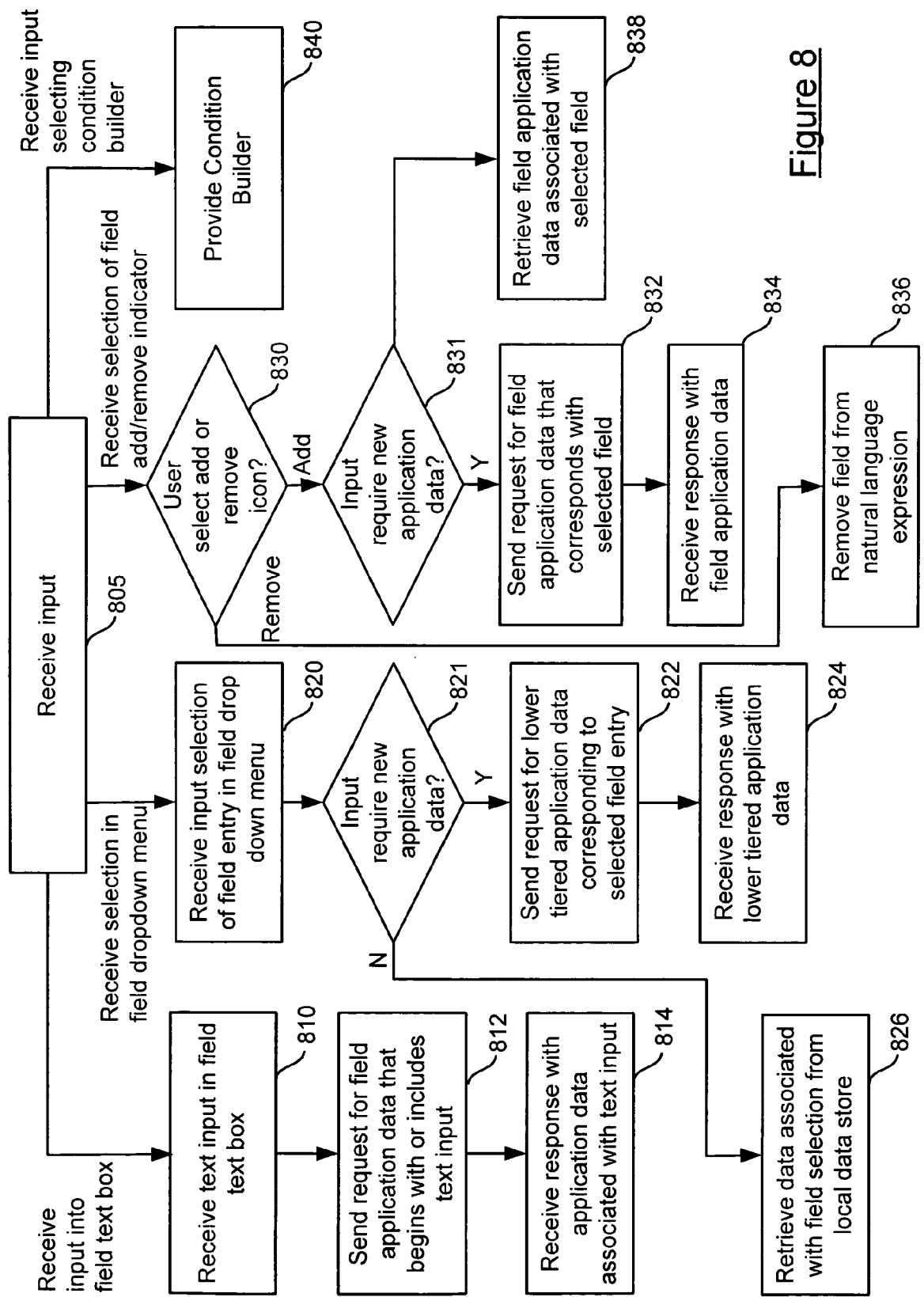
FIG. 8 is a flow chart of an embodiment of a process for processing input received for a natural language tool.

FIG. 8 is a flow chart of an embodiment of a process for processing received input for a natural language tool. In one embodiment, the flow chart FIG. 8 provides more detail for processing received input as discussed above at step 630 of FIG. 6E. Input is received through the natural language tool at step 805. If the input is received into a text box, the flow chart continues to step 810. If the input is received as a selection in a field drop down menu, the flow chart continues to step 820. If input is received as a selection of a field add or remove icon, the flow chart continues to step 830. If the received input is the selection of condition builder, the flow chart continues to step 840. Ion one embodiment, any data may be entered into a field or clause (or to add or remove a field) using drag-and-drop methods. In this case, data can be dragged out of an expression to remove it from the expression or dragged into the expression from another portion of the interface to add data, a field or clause.

Text input is received in a field text box at step 810. In one embodiment, steps 810-814 of the flow chart of FIG. 8 are performed in response to each character entered in the text box. After input is received in the field text box, a request for application data is sent to data processing module 225. The request may be for appropriate application data that begins with or includes the text entered at step 812. By requesting the text from data processing module 225, the natural language tool may retrieve data which is up to date with a dynamic pool of data in data store 305. In one embodiment, the appropriate application data includes data associated with the particular field in which data was entered. For instance, if the field is associated with servlets, then servlets having a name which includes the entered text are requested. The request is sent to data processing module 225 of enterprise manager 220. Data processing module 225 receives the request, processes the request by retrieving the appropriate data from data store 305, and generates a response. The response is then sent to natural language tool 320. Processing of the request by data processing module 225 is discussed in more detail below with respect to FIG. 11. Natural language tool 320 then receives the response with the application data associated with the field text input at step 814. An example of an interface for receiving input into a text box is discussed below with respect to FIG. 9A.

At step 820 of FIG. 8, the received input is determined to be a selection from a field drop down menu at step 820. A request is optionally sent for application data corresponding to the selected field entry step 822. In some embodiments, the natural language tool already knows the menu data items (e.g., it may be a drop-down menu for text-matching which is always one of "is, is not, contains, does not contain, begins with, ends with," etc.). The actual data requested may depend on the field and state of the expression. For example, if additional fields are to be provided in response to the most recent input which initiates the data request, the request may retrieve data associated with the additional fields to populate. The data may include an array of data elements as well as a default selection for each array. The request is sent to data processing module 225. Processing of the request by data processing module 225 is discussed in more detail below with respect to FIG. 11. A response having application data is received at step 824. The received application data for the field(s) is provided to natural language tool 320 at step 826. In this case, data is retrieved in order to expand the natural language expression in response to receiving the selection in the field drop down menu. More detail of an interface for receiving input in a field drop down menu is discussed below with respect to the interface of FIG. 9B.

When user input is received as selection of a field add or remove indicator, a determination is made at step 830 as to whether the user selected an add or remove indicator. When a user selects a remove indicator, the entire field or a field within a clause associated with remove indicator is removed from the natural language expression at step 838. In one embodiment, an event is triggered which indicates the field should be removed. The field is then not included (or removed) when the natural language expression is constructed at step 650 of FIG. 6E. If the user selected an add indicator, a request is sent for application data associated with the added field at step 832. The request may retrieve data locally or remotely depending if the request involves dynamic data stored on data store 305 or static/default data stored on client device 310. Next a response is received with application data associated with the added field at step 834. For example, the added field may be a characteristic field. In this case, the request may specify the current data in the next highest field, the "type" field. Thus, the response will include application data associated with characteristic field data that corresponds with the particular "type" data specified in the request.

If input is received selecting a condition builder at step 805, a condition builder is provided at step 840. More detail for providing a condition builder is discussed below with respect to FIG. 10A.

Figure 9A:
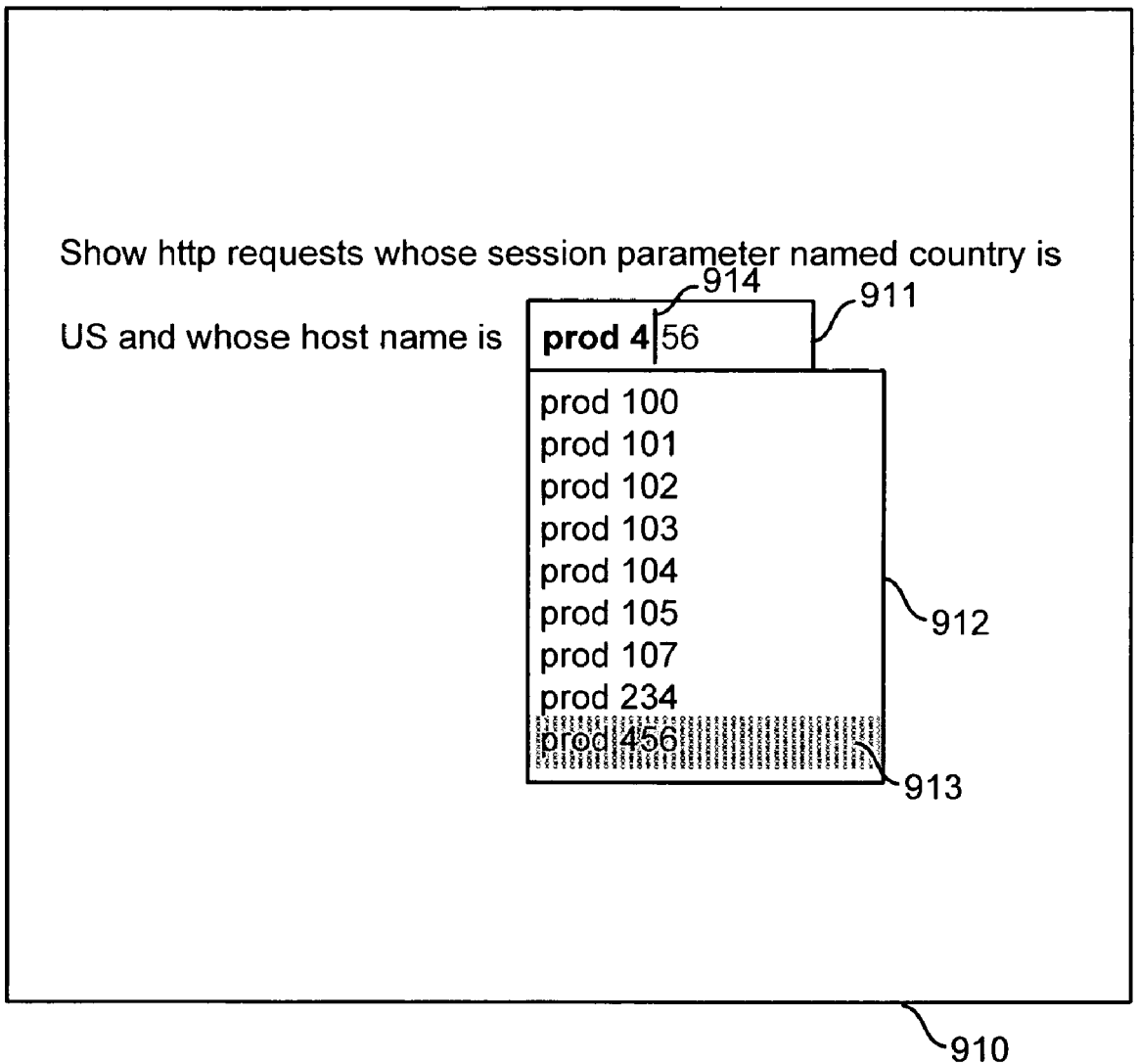
FIG. 9A is a block diagram of an embodiment of an interface for providing text input into a natural language tool.

FIG. 9A is an example of an interface for receiving text box input into a field of a natural language expression. In one embodiment, the interface of FIG. 9A is associated with receiving text in a text box as described with respect to steps 810-814 of FIG. 8. The interface is used within the natural language expression to facilitate specification of a data subset within the dynamic data set. In one embodiment, the interface of FIG. 9A is a portion of a larger interface provided as part of a natural language tool 320 at client device 310. Interface 910 includes a natural language expression within interface 910, text box 911, drop down menu 912, highlighted data member 913, and cursor 914. The natural language expression reads "Show http requests whose session parameters named country is US and whose host name is prod 4" and ends in text box 911.

Text box 911 currently includes text which reads "prod 4". The character "4" is the most recently entered text character in text box 911, as indicated by the placement of cursor 914 just after the "4." In response to receiving input of the character "4", the application monitor 315 sends a request to data processing module 225 for field application data that begins and includes the entered text. In this case, the entered text would be "prod 4". Data processing module 225 receives the request, processes the request, and sends application data to natural language tool 320 in a response. The application data returned in the response is then displayed in drop down menu 912. In another embodiment, a single query is made in response to detecting the host name field in the sentence. Once host names are retrieved, the natural language tool handles all the processing of what type-ahead to show and how to cull the menu.

Drop down menu 912 includes a list of data elements associated with text "prod." The listed data elements are host names which include the text "prod" and were retrieved in response to receiving the entry of a space after the entry of the character "d", all before the character "4" was entered into the text box. With the addition of the "4" character, the data element named "prod 456" would be the closest match to the text in text box 911. Because the "4" also reduces the number of potential data elements matching the entered text, the number of data elements in the drop down menu would be reduced to the number proper matching elements. Additionally, the best matching data element is provided as a default in the text box, as illustrated in FIG. 9A.

FIG. 9B is an example of an interface 920 for receiving a selection in a drop down menu associated with a field in a natural language expression. The interface of FIG. 9B is associated with steps 820-824 of FIG. 8 discussed above. Interface 920 includes a natural language expression, field boxes 921 and 922, drop down menu 923, highlighted data element 924 and quantity information 925. Other fields may exist in the expression but are not shown for purposes of discussion. The natural language expression reads "Show servlets named A having parameter named country and which call EJB." Field 921 is a relationship field and field 922 is a type field. Field 921 is provided in response to the previous text and field selection in the natural language expression. In particular, field 921 includes a data element of "calls," which is associated with a relationship between the "servlet" mentioned earlier in the natural language expression and the EJB mentioned in field 922. Field 921 has a default data member of "calls" as indicated in drop down menu 923 and highlight 924. In addition to the default entry of "calls", other entries are provided in the drop down menu as well, including is called by, contains, is contained by, and an arrow indicating more choices are available.

Quantity information 925 as illustrated in FIG. 9B indicates the number of matches for a particular field. In the embodiment illustrated, the quantity information of "12" indicates the number of EJBs that are called by a servlet named A having a parameter named country. Quantity information may indicate a number of matches for a field, a clause, the first specified type in a natural language expression, or some other group of elements. In some embodiments, when the number of matches is currently one but may be increased in response to user input which edits, adds or removes one or more fields, the quantity information may include a quantity indicator. The quantity indicator indicates that the single match may change.

Quantity information may be retrieved from a data store in response to user input. In one embodiment, after receiving input into a natural language expression provided by a natural language tool, the tool will retrieve data in response to the input. The data may include a set of data elements for the field in which input was received as well as lower tiered fields. In some cases, the data retrieved may include a number of matching data elements for one or more individual fields or clauses.

Figure 9C:
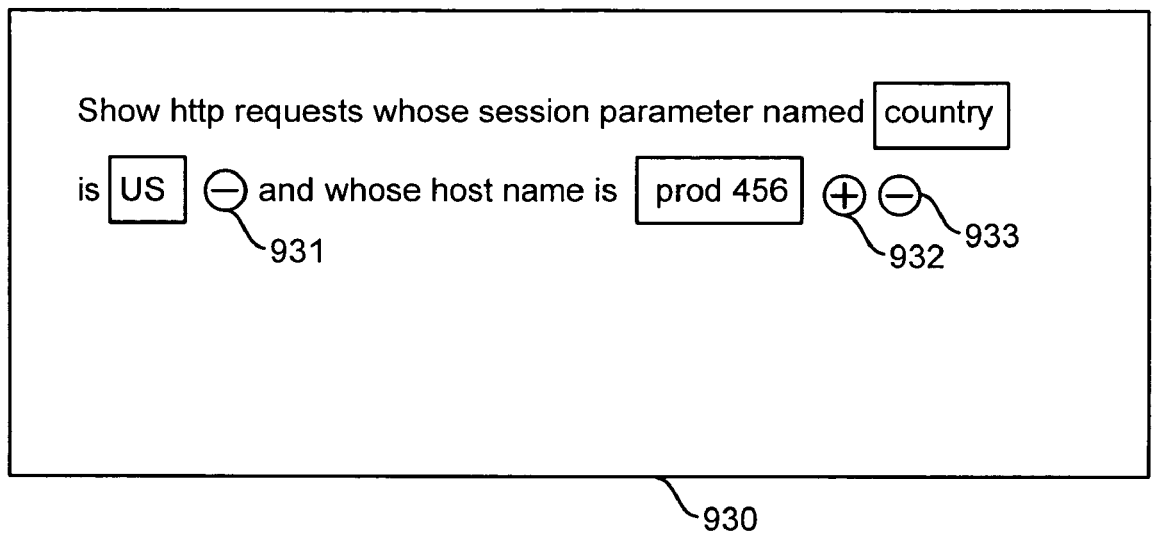
FIG. 9C is a block diagram of an embodiment of an interface providing field manipulation features in a natural language tool.
Figure 10A:
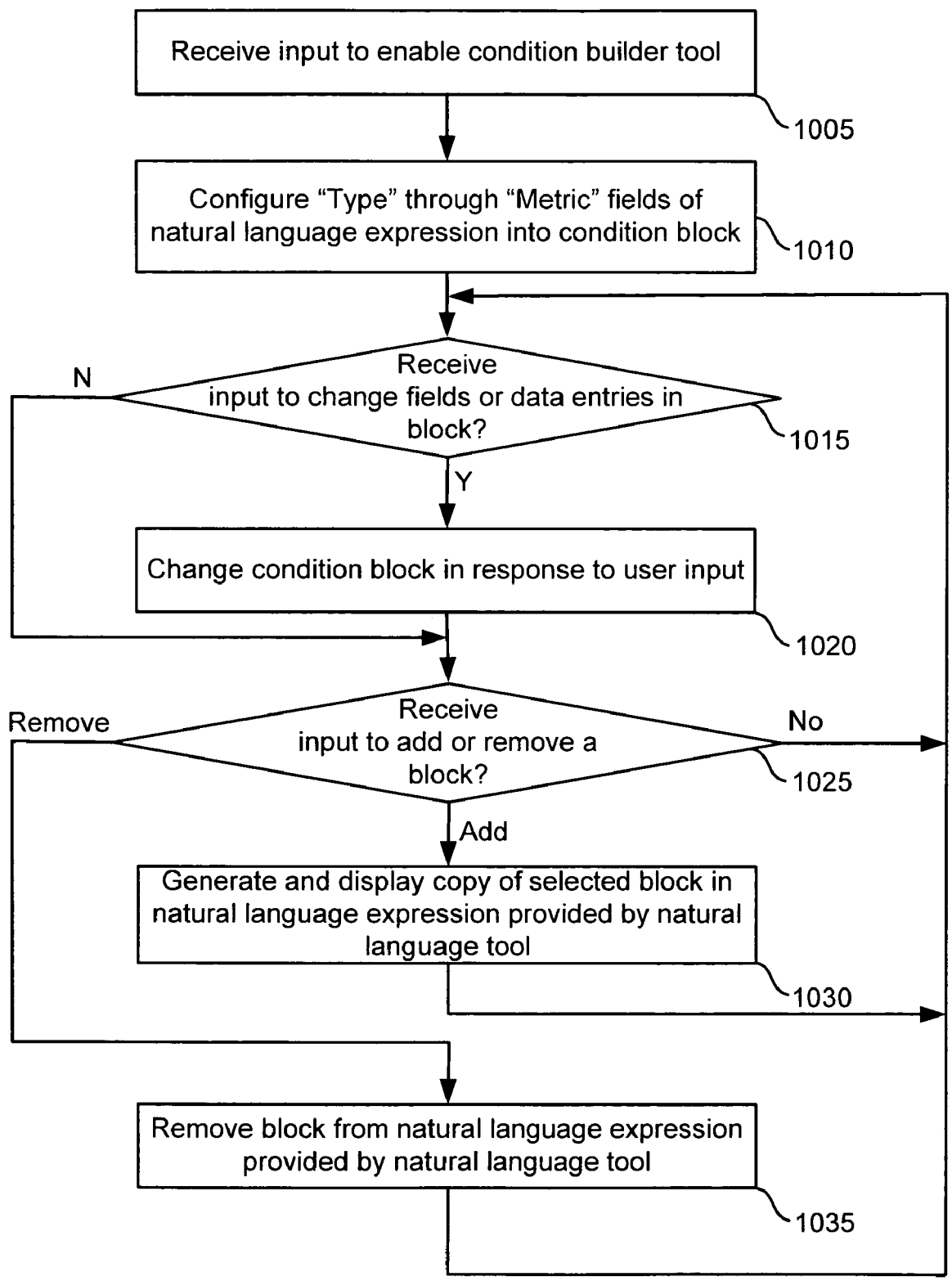
FIG. 10A is a flow chart of an embodiment of a process for constructing conditions using a natural language tool.

FIG. 9C is an example of an interface providing field manipulation features within a natural language expression provided by natural language tool 320. In particular, the field manipulation involves adding and removing a field within a clause within a natural language expression. In one embodiment, the interface of FIG. 9C is associated with steps 830-836 in the flowchart of FIG. 8. Interface 930 of FIG. 9C provides a natural language expression with remove field indicators 931 and 933 and an add field indicator 932. Add and remove indicators can be associated with a field, a clause including two or more fields, or the expression in its entirety. In particular, the characteristic field containing the clause "is US" is associated with a remove indicator 931. The user may select remove indicator 931 by positioning a cursor over the indicator and entering input to select the indicator. In response to the selection, the clause "is US" having the data would be removed from the expression. The characteristic field having data "prod 456" is associated with add indicator 932 and a remove indicator 933. Upon selection of remove indicator 933, the characteristic field would be removed from the natural language expression. If add indicator 932 were selected, options for additional field categories can be provided to a user in a drop down menu. The options are selected based on the state of the expression. For example, if the last field was a "type" or "characteristic" field, a characteristic or relationship field could be added. The options can be derived from the block diagram illustrating tiered field relationships in FIG. 5A In one embodiment, a condition builder may or may not be provided within a of natural language tool. In some cases, if the system requires a series of conditions from the user, it presents them with a condition builder (for example, in alerts and application definitions). If the system does not require a series of conditions, a natural language tool is provided without a condition builder (for example, for show or plot options for data visualizations). FIG. 10A illustrates a flowchart of an embodiment of a process for providing a condition builder tool within a natural language tool. In one embodiment, the flowchart of FIG. 10A provides more detail for step 840 of the flowchart of FIG. 8. First, input is received to enable a condition builder at step 1005. In one embodiment, the input may be received by selection of a condition indicator within a natural language tool. An example of an interface which includes a condition indicator is provided in FIG. 10B and discussed in more detail below. Next, a portion of a natural language expression is provided in a block of a condition builder tool at step 1010. In one embodiment, the provided fields or clauses depend on the context. For example, when defining an application, metrics need not be specified. In one embodiment, the portion of the natural language expression configured into a condition builder block are the "type" through "metric" fields of the expression. Thus, the entire expression other than the command field is placed within the condition builder block. In some embodiments, no command field is needed. In this case, whether or not to include a command field may be based on context (for example, a command field may not be required for use with alerts or application definition). This is illustrated in interface of FIG. 10C and discussed in more detail below.

Next, a determination is made as to whether input has been received to change the condition builder block at step 1015. Input to change the condition builder block may be received and processed as discussed above with respect to FIG. 8. In particular, input may be received through a drop down menu, typing text into a text box, removing a field, drag and drop or in some other manner. If no input is received to change the condition builder block, the flowchart of FIG. 10A continues to step 1025. If input is received to change the condition builder block, then the block is changed in response to the received user input at step 1020. The flowchart of FIG. 10A then continues to step 1025. Changing a natural language expression in response to user input is discussed in more detail above with respect to FIG. 8.

A determination is made as to whether input has been received to add or remove a condition block in the condition builder tool at step 1025. In one embodiment, the input to add or remove a condition block may be received as a user selection of a condition block indicator. A condition block indicator is displayed in the interface of FIG. 10C and is discussed in more detail below. If no input is received to add or remove a condition block, the flowchart of FIG. 10A returns to step 1015. If input is received to add a condition block, the block is generated and displayed by natural language tool at step 1030. In one embodiment, the block associated with the input received at step 1025 is copied or cloned. In this case, the generated block is a copy, or clone, of the block associated with the received input. In one embodiment, this cloning procedure may be used to generate conditions which are the same, and then slightly alter them after their generation to construct a number of similar conditions within a natural language expression. After generating the additional condition block at step 1030, the flowchart of FIG. 10A returns to step 1015. An example of an addition of a condition block is displayed in FIG. 10D and discussed in more detail below. If input is received at step 1025 to remove a condition block, the block is removed at step 1035 and the flowchart returns to step 1015. In some embodiments, all of the data elements, fields or clauses specified within a condition block are ANDed together. Between blocks, the conditions can be ANDed or ORed as specified by a user (by an "and" "or" option that refers to the entire condition builder, not illustrated in FIG. 10D).

FIG. 10B-10D illustrates examples of an interface for providing a condition builder tool. FIG. 10B illustrates a natural language filter expression which can be processed by a condition builder tool. The expression of FIG. 10B reads "Show http requests whose session parameter named country is US or whose session parameter named country is Canada and whose host name is prod 456". Read without context, this expression can be ambiguous and difficult to translate. In one instance, elements and fields of the expression can be grouped as "all http requests (whose session parameter named country is US or whose session parameter named country is Canada) and whose host name is prod 456." The expression fields may also be grouped as "all http requests whose session parameter named country is US or (whose session parameter named country is Canada and who's host name is prod 456)." In this case, an http request with an http parameter "country" is US and "host prod 123" would not match interpretation 1 but would match interpretation 2.

FIG. 10C is an interface which includes the natural language expression of FIG. 10B within a condition builder tool. The interface of FIG. 10 is associated with step 1010 of FIG. 10A. The interface of FIG. 10C includes field boxes 1051, 1052 and 1053, add field indicator 1054, and condition block indicators 1055 and 1056. In particular, add block indicator 1055 allows a user to add a condition block and remove block indicator 1056 allows a user to remove a condition block. The expression of FIG. 10C includes the command field with data of "show" followed by the remainder of the expression in a condition block. The content within the condition block is separated by two dashed lines. In this case, the remainder of the expression is placed within the condition block.

FIG. 10D illustrates the natural language expression within a condition builder tool with an additional condition block. In particular, the interface of FIG. 10D, illustrates the condition builder of FIG. 10C after copy block indicator 1055 has been selected. The condition builder tool of FIG. 10D includes condition builder blocks 1062 and 1064, a natural language expression having embedded fields 1051, 1052, 1053 and 1057, and indicators 1054-1056 and 1058-1059.

The condition block tool interface of FIG. 10D includes condition blocks 1062 and 1064, bordered and separated by dashed lines. When additional condition blocks are generated, they may be identical to the block from which the add block indicator was selected. Once the block is generated, fields within the block may be changed by a user to configure the block. In the case of the interface of FIG. 10D, the second builder block has been processed to change the data element in characteristic field 1057 from "US" to "Canada." The second condition block includes condition block add and remove indicators 1058 and 1059, respectively. The natural language expression of FIG. 10D in condition builder block format now matches the natural language filter expression of FIG. 10B.

In one embodiment, a copy function may be implemented in the condition builder tool. In this case, a "copy" button is provided in interface providing the condition builder. When selected by a user, a new alterable copy of the source condition (or other condition block associated with the copy button) is generated and displayed the condition builder. This differs from the "+" button, which creates a new blank copy of a condition.

Figure 11:
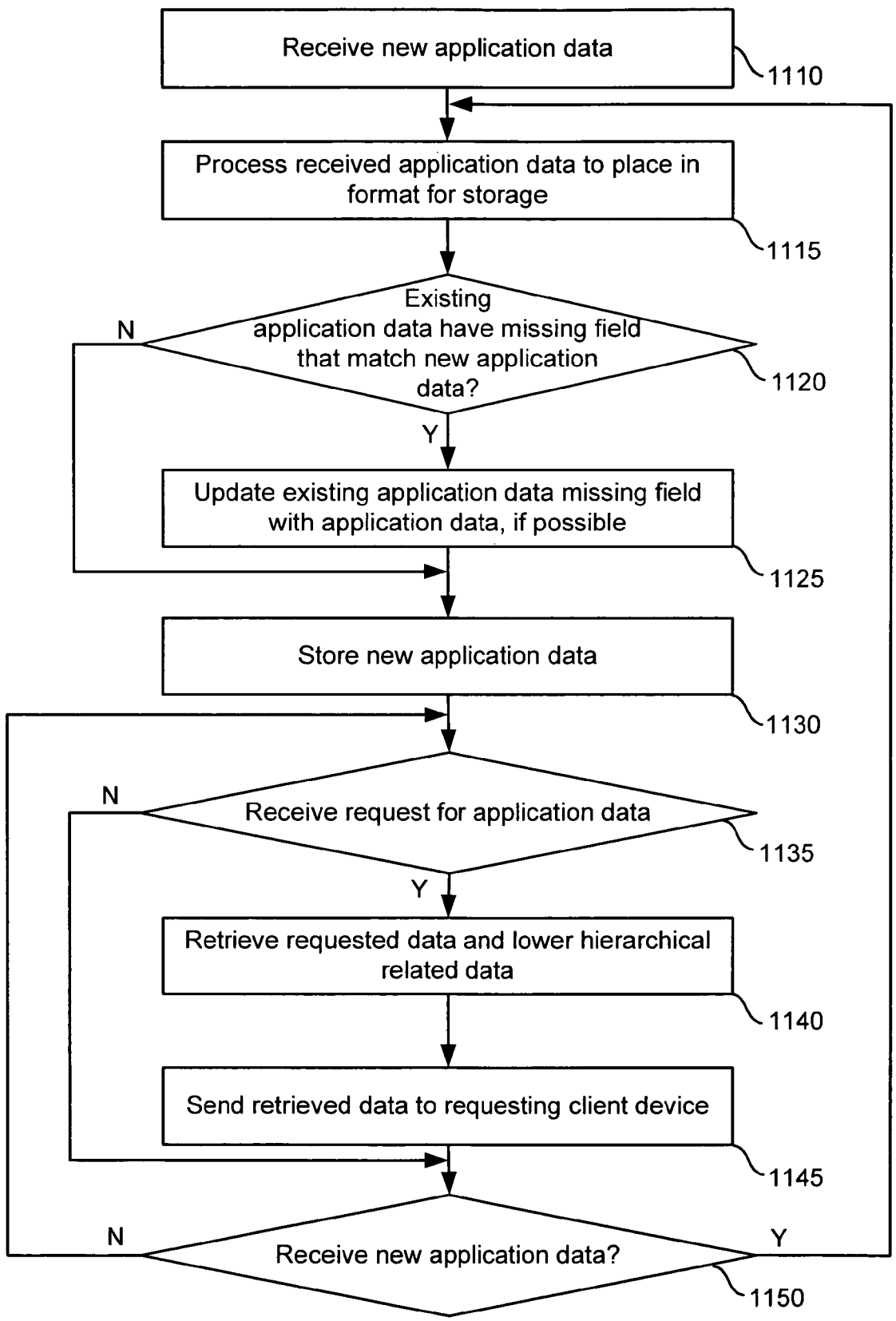
FIG. 11 is a flow chart of an embodiment of a process for managing a data model which supports a natural language tool.

In one embodiment, data store 305 is used to support natural language tool 320. Data store 305 may provide data to requesting natural language tool 320 and receive information from agent 140. FIG. 11 is a flowchart of an embodiment of a process for managing a data store which supports natural language tool 320. In one embodiment, the flowchart of FIG. 11 provides more detail for receiving data and processing the requests received from natural language tool 320 (such as in step 730 of FIG. 7 and steps 812, 822 and 832 of FIG. 8) residing on client device 310.

New application data is received at step 1110. The new application data may be received by data processing module 225 from agent 140. In one embodiment, the data received from agent 140 is data retrieved from an application server. The new application data is received from agent 140 residing on application server 210. The new application data may include a particular type of data as well as characteristic data and relationship data associated with the primary data.

Next, the received application data is processed to place it in a format suitable for storage at step 1115. In one embodiment, this may include removing header information, extracting the primary, characteristic or relationship data and other processing. A determination is then made as to whether any existing application data within data model 140 has missing fields corresponding to the new application data at step 1120. If there is a match, the unknown data is provided into the empty or missing field. If no existing application data has missing fields which match the new application data, the flowchart of FIG. 11 continues to step 1130. If the existing application data has missing fields that match the new application data, the flowchart of FIG. 11 continues to step 1125. The existing application data is updated with the missing application data (if possible) at step 1125. Next, the new application data is stored at step 1130. Storing the new application data may include storing the primary type of data, and the characteristic and relationship data associated with the primary data. This is discussed in more detail below with respect to FIG. 12.

Next, a determination is made as to whether a request is received for the application data at step 1135. In one embodiment, a request may be received from natural language tool 320. If no request is received for the application data, the flowchart continues to step 1150. If a request is received for the application data, the requested data is retrieved at step 1140. For example, if an EJB was requested, the retrieved data would include the EJB data as well as characteristic data associated with the EJB. Once the data is requested, the retrieved data is packaged in a response and sent to the requesting device at step 1145. Operation then continues to step 1150 where a determination is made as to whether new application data has been received. If no new application data is received, the flowchart of FIG. 11 returns to step 1135. If new application has been received, the flowchart of FIG. 11 returns to step 1115 where the new application data is processed.

FIG. 12A illustrates a table of an exemplary data format for use with a natural language tool. In one embodiment, the exemplary data format of FIG. 12A is associated with storing data as discussed above with respect to step 1130 of the flowchart of FIG. 11.

The table of FIG. 12A illustrates a first data member and related lower tiered data fields. In this case, the first data member is a "type" data of "EJB." The lower field categories are "characteristic" and "relationship." The characteristic data for the EJB includes name, parameter and output. The relationship data includes called by, calls, contains and contained by.

The figure of 12B illustrates an exemplary data structure in which data may be maintained in data store 130. The data structure includes several fields of data. In particular, the first field of data is the primary data EJB. The next fields of data include the first lower tiered data associated with the primary data. In one embodiment, lower relational data includes pointers to the actual memory locations to the characteristic data associated with the primary data. For example, a pointer exists to the EJB name within the characteristic data within data structure 1230.

In some embodiments, the data structure for data stored in a data store may differ from that discussed above with respect to FIGS. 12A-B. In this case, the data model may include information regarding nested relationships between data. For example, a data entry for an EJB called "EJB1" may include the response time of EJB1 when called be EJB2, when EJB2 is called by servlet 1. In this case, each data entry (that is, the entry for each component of the system) includes data for each call path that it was in. This data structure provided information for queries about any call chain associated with the data entry. Additionally, data can be aggregated for simpler queries. For example, for a query for the response time of EJB1 when called by EJB 2, the call chains in which the call occurred can be averaged. Queries for this data structure may also occur for objects that comprise a grouping of other objects. In this case, the data model could aggregate data in much the same way (e.g., to get the response time of a host, the average response times of all the servlets on that host could be retrieved).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for creating an expression to specify a subset of data, comprising:
    receiving a selection of a command;
    in response to receiving the selection of the command, displaying a natural language expression that includes the command and at least a first changeable field embedded in the displayed natural language expression;
    receiving a indication of first data for the first changeable embedded field from a direct interaction with the displayed natural language expression;
    modifying the natural language expression in response to the first data and displaying the modified natural language expression;
    displaying an add field indicator;
    receiving a selection of the add field indicator from a direct interaction with the displayed natural language expression;
    in response to the selection of the add field indicator, adding a second changeable field embedded in the natural language expression and displaying the natural language expression with the second changeable field embedded in the displayed natural language expression;
    receiving an indication of second data for the second changeable embedded field from a direct interaction with the displayed natural language expression; and
    modifying the natural language expression in response to the second data and displaying the modified natural language expression.

2. The method of claim 1, further comprising:
    displaying a remove field indicator, the remove field indicator is associated with at least one changeable embedded field displayed in the natural language expression;
    receiving a selection of the remove field indicator from a direct interaction with the displayed natural language expression; and
    modifying the natural language expression by removing the at least one embedded field from the natural language expression and displaying the modified natural language expression.

3. The method of claim 1, further comprising:
    displaying a first remove field indicator, the first remove field indicator is associated with a first changeable embedded field displayed in the natural language expression;
    displaying a second remove field indicator, the second remove field indicator is associated with a set of multiple changeable embedded fields displayed in the natural language expression, the set of multiple changeable embedded fields includes the first changeable embedded field;
    modifying the natural language expression by removing the first changeable embedded field from the natural language expression and displaying the modified natural language expression, if a selection of the first remove field indicator is received; and
    modifying the natural language expression by removing the set of multiple changeable embedded fields from the natural language expression and displaying the modified natural language expression, if a selection of the second remove field indicator is received.

4. The method of claim 1, further comprising:
    making a copy of a portion of the displayed natural language expression, the copy of the portion of the displayed natural language expression includes one or more changeable embedded fields displayed in the portion of the displayed natural language expression;
    displaying the copy of the portion of the displayed natural language expression with the one or more changeable embedded fields displayed in the copy of the portion of the displayed natural language expression;
    changing data in at least one of the one or more changeable embedded fields displayed in the copy of the portion of the displayed natural language expression;
    modifying the copy of the portion of the displayed natural language expression based on the changing data;
    displaying the natural language expression with the portion of the displayed natural language expression and the copy of the portion, the copy of the portion being displayed with the changed data in the at least one of the one or more changeable embedded fields.

5. The method of claim 1, further comprising:
accessing a set of data, the natural language expression identifies a subset of the set of data;
determining a condition of the set of data; and
pre-populating at least a portion of the natural language expression based on the determined condition, the pre-populating includes adding the command to the natural language expression, the selection of the command includes accepting the adding of the command to the natural language expression.

6. The method of claim 1, further comprising:
accessing a group of data;
identifying a subset of the group of data that is defined by the displayed natural language expression; and
reporting the subset of the group of data.

7. The method of claim 1, wherein:
the receiving the indication of first data includes receiving text in a text box.

8. The method of claim 1, wherein:
the receiving the indication of first data includes receiving a selection from a drop down menu.

9. One or more processor readable storage devices having processor readable code embodied on the processor readable storage devices, the processor readable code for programming one or more processors to perform a method comprising:
(a) receiving a selection of a command;
(b) displaying a natural language expression that includes the command and at least a new changeable field embedded in the displayed natural language expression;
(c) receiving an indication of data for the new changeable embedded field from direct interaction with the displayed natural language expression;
(d) modifying the natural language expression in response to the received data and displaying the modified natural language expression;
(e) displaying an add field indicator and a remove field indicator, the remove field indicator is associated with at least one embedded field displayed in the natural language expression;
(f) repeating steps (b)-(e) if the add field indicator is selected; and
(g) modifying the natural language expression by removing the at least one embedded field from the natural language expression and displaying the modified natural language expression.

10. One or more processor readable storage devices according to claim 9, wherein the method further comprises:
making a copy of a portion of the displayed natural language expression, the copy of the portion of the displayed natural language expression includes one or more changeable embedded fields displayed in the portion of the displayed natural language expression;
displaying the copy of the portion of the displayed natural language expression with the one or more changeable embedded fields displayed in the copy of the portion of the displayed natural language expression;
changing data in at least one of the one or more changeable embedded fields displayed in the copy of the portion of the displayed natural language expression;
modifying the copy of the portion of the displayed natural language expression based on the changing data;
displaying the natural language expression with the portion of the displayed natural language expression and the copy of the portion, the copy of the portion being displayed with the changed data in the at least one of the one or more changeable embedded fields.

11. One or more processor readable storage devices according to claim 9, wherein the method further comprises:
accessing a set of data, the natural language expression identifies a subset of the set of data;
determining a condition of the set of data; and
pre-populating at least a portion of the natural language expression based on the determined condition, the pre-populating includes adding the command to the natural language expression, the selection of the command includes accepting the adding of the command to the natural language expression.

12. One or more processor readable storage devices according to claim 9, wherein the method further comprises:
accessing a group of data;
identifying a subset of the group of data that is defined by the displayed natural language expression; and
reporting the subset of the group of data.

13. An apparatus that can be used to specify a subset of data, comprising:
a communication interface;
a storage device; and
one or more processors in communication with the storage device and the communication interface, the one or more processors receive a selection of a command and display a natural language expression that includes the command and at least a first changeable field embedded in the displayed natural language expression in response to receiving the selection of the command, the one or more processors receive a indication of first data for the first changeable embedded field from a direct interaction with the displayed natural language expression and modify the natural language expression in response to the first data and display the modified natural language expression, the one or more processors display an add field indicator, the one or more processors receive a selection of the add field indicator from a direct interaction with the displayed natural language expression and add a second changeable field embedded in the natural language expression in response to the selection of the add field indicator and display the natural language expression with the second changeable field embedded in the displayed natural language expression, the one or more processors receive a indication of second data for the second changeable embedded field from a direct interaction with the displayed natural language expression and modify the natural language expression in response to the second data and display the modified natural language expression.

14. The apparatus claim 13, wherein:
the one or more processors display a remove field indicator, the remove field indicator is associated with at least one changeable embedded field displayed in the natural language expression;
the one or more processors receive a selection of the remove field indicator from a direct interaction with the displayed natural language expression; and
the one or more processors modify the natural language expression by removing the at least one embedded field from the natural language expression and display the modified natural language expression.

15. The apparatus claim 13, wherein:
the one or more processors display a first remove field indicator, the first remove field indicator is associated with a first changeable embedded field displayed in the natural language expression;
the one or more processors display a second remove field indicator, the second remove field indicator is associated with a set of multiple changeable embedded fields displayed in the natural language expression, the set of multiple changeable embedded fields includes the first changeable embedded field;

if a selection of the first remove field indicator is received, the one or more processors modify the natural language expression by removing the first changeable embedded field from the natural language expression and display the modified natural language expression; and if a selection of the second remove field indicator is received, the one or more processors modify the natural language expression by removing the set of multiple changeable embedded fields from the natural language expression and display the modified natural language expression.

16. The apparatus claim 13, wherein:

the one or more processors make a copy of a portion of the displayed natural language expression, the copy of the portion of the displayed natural language expression includes one or more changeable embedded fields displayed in the portion of the displayed natural language expression;

the one or more processors display the copy of the portion of the displayed natural language expression with the one or more changeable embedded fields displayed in the copy of the portion of the displayed natural language expression;

the one or more processors change data in at least one of the one or more changeable embedded fields displayed in the copy of the portion of the displayed natural language expression;

modifying the copy of the portion of the displayed natural language expression based on the changing data; and the one or more processors display the natural language expression with the portion of the displayed natural language expression and the copy of the portion, the copy of the portion being displayed with the changed data in the at least one of the one or more changeable embedded fields.

17. The apparatus claim 13, wherein:

the one or more processors access a set of data, the natural language expression identifies a subset of the set of data;

the one or more processors determine a condition of the set of data; and the one or more processors pre-populate at least a portion of the natural language expression based on the determined condition, the pre-populating includes adding the command to the natural language expression, the selection of the command includes accepting the adding of the command to the natural language expression.

18. The apparatus claim 13, wherein:

the one or more processors access a group of data;

the one or more processors identify a subset of the group of data that is defined by the displayed natural language expression; and the one or more processors report the subset of the group of data.

\* \* \* \* \*